United States Patent
Larson et al.

(10) Patent No.: US 10,280,904 B2
(45) Date of Patent: May 7, 2019

(54) ELECTRICALLY ACTIVATED PIVOT ASSEMBLY

(71) Applicant: Northrop Grumman Systems Corporation, Falls Church, VA (US)

(72) Inventors: Gregory L. Larson, Palos Verdes, CA (US); Peter A. Barnett, Costa Mesa, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 393 days.

(21) Appl. No.: 15/065,185

(22) Filed: Mar. 9, 2016

(65) Prior Publication Data
US 2017/0260973 A1   Sep. 14, 2017

(51) Int. Cl.
| | | |
|---|---|---|
| *F03G 7/06* | (2006.01) | |
| *B64C 3/56* | (2006.01) | |
| *B64C 39/02* | (2006.01) | |
| *B64D 5/00* | (2006.01) | |
| *B64D 7/00* | (2006.01) | |

(52) U.S. Cl.
CPC ............. *F03G 7/065* (2013.01); *B64C 3/56* (2013.01); *B64C 39/024* (2013.01); *B64D 5/00* (2013.01); *B64D 7/00* (2013.01); *B64C 2201/021* (2013.01); *B64C 2201/082* (2013.01); *B64C 2201/102* (2013.01)

(58) Field of Classification Search
CPC ......... F03G 7/065; B64C 3/56; B64C 39/024; B64C 2201/102; B64C 2201/082; B64C 2201/021; B64D 5/00; B64D 7/00
See application file for complete search history.

(56) References Cited

U.S. PATENT DOCUMENTS

| | | | |
|---|---|---|---|
| 4,010,455 A | 3/1977 | Stange | |
| 4,761,955 A | 8/1988 | Bloch | |
| 4,900,078 A | 2/1990 | Bloch | |
| 4,965,545 A * | 10/1990 | Johnson | F03G 7/065 337/140 |
| 7,852,190 B1 | 12/2010 | Woychik et al. | |

(Continued)

OTHER PUBLICATIONS

Sofla, A. Y. N. et al; Shape morphing of aircraft wing: Status and challenges; Materials & Design 31, No. 3; 2010; pp. 1284-1292; Elsevier Ltd.

(Continued)

*Primary Examiner* — Valentina Xavier
(74) *Attorney, Agent, or Firm* — McCracken & Gillen LLC

(57) ABSTRACT

An exemplary rotational assembly includes a base having a circular collar and first and second arms that rotate about the circular collar in opposite angular directions. In a stored state the arms have substantially the same angle relative to the circular collar; in a deployed state the arms have rotated into opposing positions. Each end of a Nitinol wire is coupled to the first and second arms and contracts when heated by the flow of electrical current. This contraction causes the simultaneously application of a rotational force to the first and second arms causing the first and second arms to rotate about the circular collar in opposite angular directions. The simultaneous counter rotating angular forces during rotation of the arms causes no substantial change in angular inertia at the base.

19 Claims, 4 Drawing Sheets

(56) References Cited

U.S. PATENT DOCUMENTS

| | | | |
|---|---|---|---|
| 8,245,516 B2 | 8/2012 | Song et al. | |
| 9,545,991 B1* | 1/2017 | Alley | B64C 3/40 |
| 9,857,549 B1* | 1/2018 | Shin | F03G 7/065 |
| 9,897,078 B2* | 2/2018 | Nicholson | F03G 7/065 |
| 2005/0195064 A1 | 9/2005 | Biasiotto et al. | |
| 2008/0271470 A1 | 11/2008 | Cheetham et al. | |
| 2009/0286101 A1* | 11/2009 | Sar | B64C 3/40 |
| | | | 428/613 |
| 2013/0067908 A1 | 3/2013 | Pittaccio | |
| 2017/0342968 A1* | 11/2017 | Nicholson | F03G 7/065 |
| 2017/0369150 A1* | 12/2017 | Finklea | B64C 3/56 |
| 2018/0086454 A1* | 3/2018 | Cook | B64C 39/024 |
| 2018/0149142 A1* | 5/2018 | Bunting | F03G 7/065 |

OTHER PUBLICATIONS

Guglieri, G. et al; Experimental Characterization of Actuators for Micro Air Vehicles; International Journal of Micro Air Vehicles; vol. 3, No. 2; 2011; pp. 49-59.

Elahinia, M.H. et al; Design of a Kalman filter for rotary shape memory alloy actuators; Smart materials and Structures vol. 13, No. 4 (2004); pp. 691-697; 2004 IOP Publishing Ltd.

Senthilkumar, P. et al; Development and wind tunnel evaluation of a shape memory alloy (SMA) based trim tab actuator for a civil aircraft; Smart Materials and Structures vol. 22, No. 9 (2013): 095025.

Hartl, D. J. et al; Aerospace applications of shape memory alloys; Proceedings of the Institution of Mechanical Engineers, Part G: Journal of Aerospace Engineering 221, No. 4 (2007): pp. 535-552.

* cited by examiner

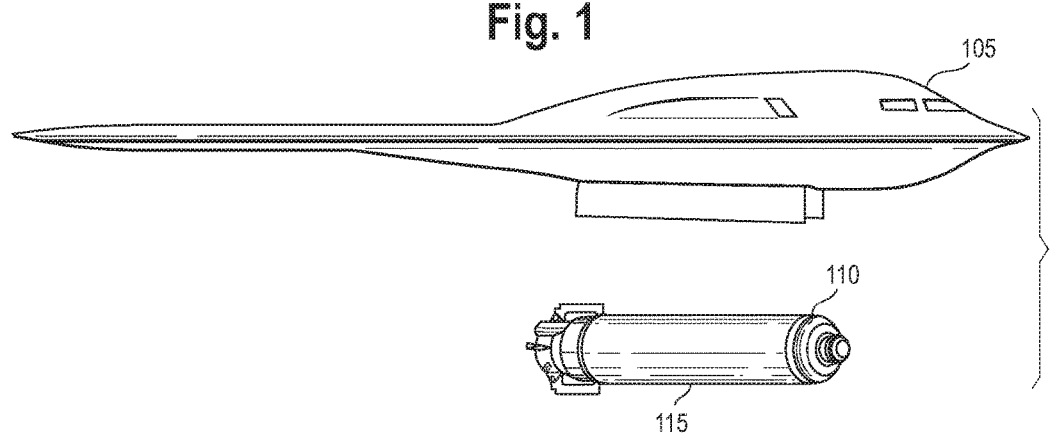
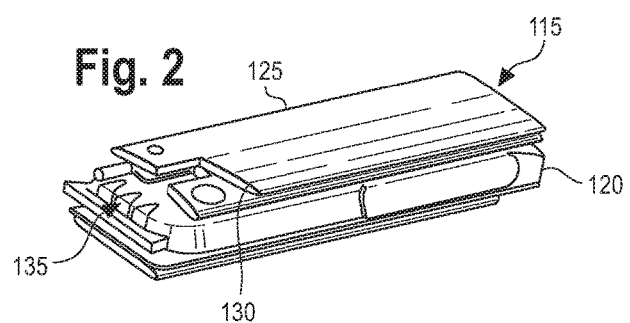
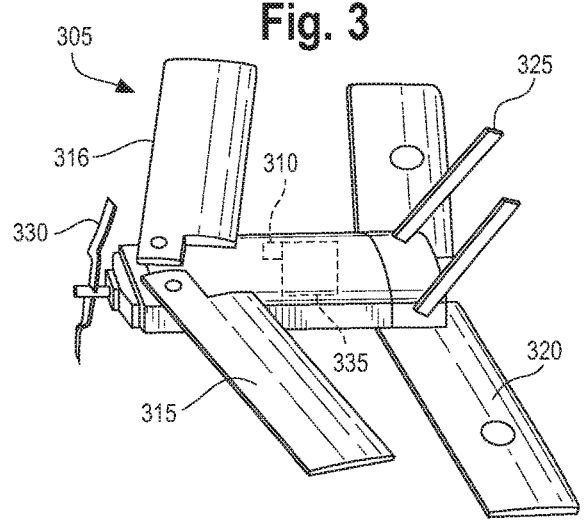

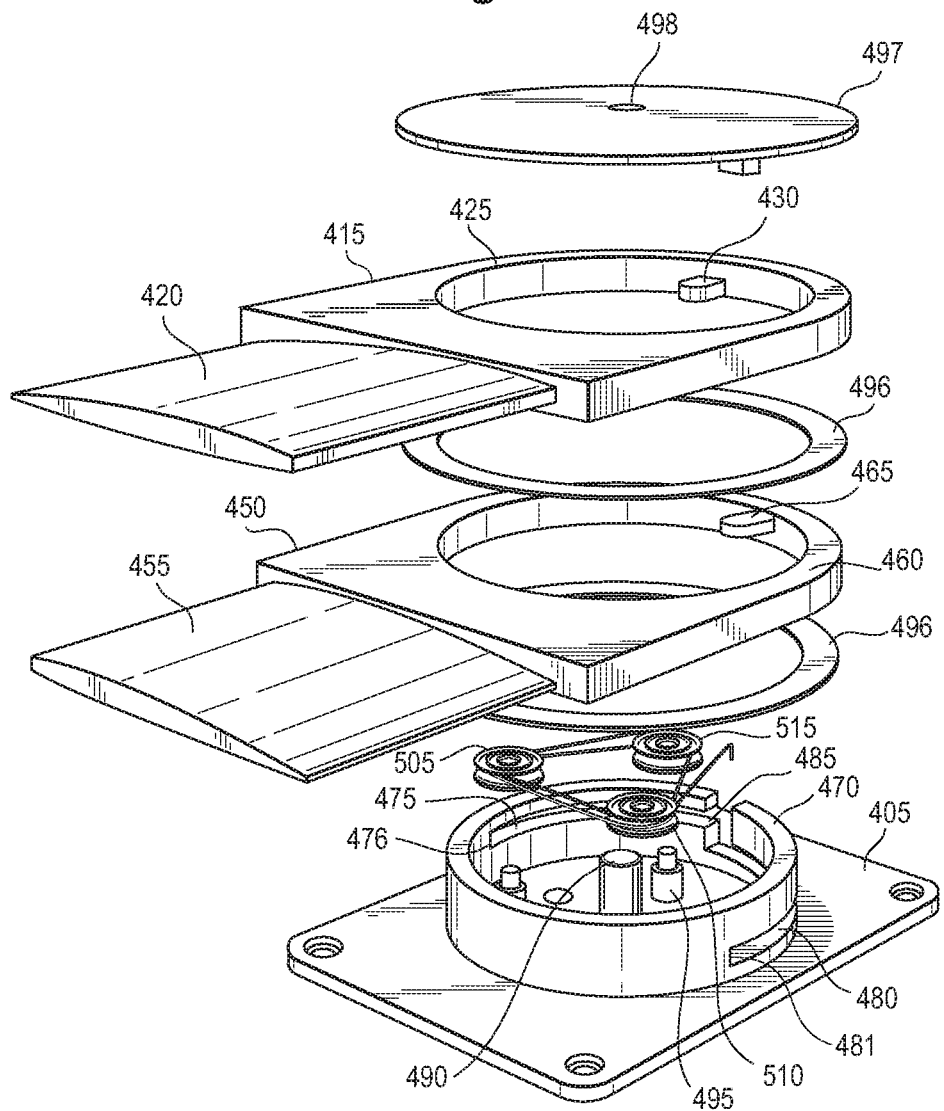

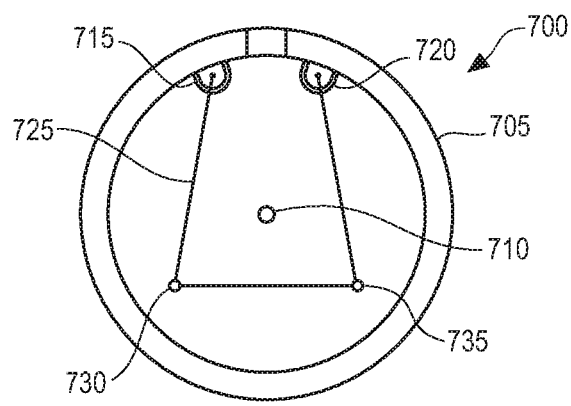
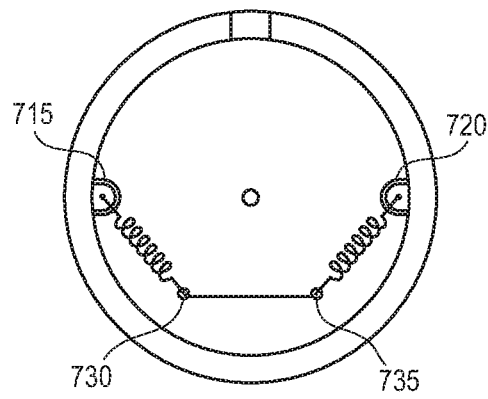

ELECTRICALLY ACTIVATED PIVOT ASSEMBLY

BACKGROUND

This invention generally relates to pivot mechanisms and more specifically relates to electrically activated pivot mechanisms in which two arms are simultaneously pivoted between a position in which the arms are parallel and a position in which the arms rotate in opposing angular directions to extend away from each other.

Various types of mechanical pivots and hinges have been utilized for different applications. Pivotally mounted levers have been used to transfer mechanical movement to other objects. Solenoids driven by electrical current cause an associated arm to move from one position to another and can be used to apply force to other objects. While such electrically initiated mechanical motion is suited for many applications, other applications have requirements for which it is not well suited, and in some applications, it is completely unusable in view of requirements and/or constraints of the application.

SUMMARY

It is an object of the present invention to provide an electrically driven pivot assembly having characteristics that are advantageous especially for some applications.

An exemplary rotational assembly includes a base having a circular collar and first and second arms that rotate about the circular collar in opposite angular directions. In a stored state the arms have substantially the same angle relative to the circular collar; in a deployed state the arms have rotated into opposing positions. Each end of a Nitinol wire is coupled to the first and second arms and contracts in length when heated by the flow of electrical current. This contraction causes the simultaneously application of a rotational force to the first and second arms causing the first and second arms to rotate about the circular collar in opposite angular directions. The simultaneous counter rotating angular forces during rotation of the arms causes no substantial change in angular inertia at the base.

Another embodiment includes an unmanned aeronautical vehicle having first and second arms that are substantially adjacent each other in a stored state but being extendible in a deployed state to be substantially opposite each other. The rotational assembly described above is utilized to deploy the first and second arms.

An exemplary method provides for rotating first and second arms from a stored state to a deployed state. In the stored state, each arm has substantially the same angle relative to a circular member; in the deployed state, the first and second arms have each rotated to be substantially opposite to each other. The first and second arms are rotatably mounted to the circular member. Each end of a Nitinol wire is attached to the first and second arms where at least portions of the Nitinol wire have been conditioned to contract in length when heated. At least one intermediate portion of the Nitinol wire is supported by an anchor. Sufficient electrical current is applied to the Nitinol wire to cause enough heating to cause the Nitinol wire to contract as trained. The contracting of the Nitinol wire simultaneously applying a rotational force to the first and second arms in the stored state causing the first arm to rotate about the circular member in one angular direction and the second arm to rotate about the circular member in an opposite angular direction. No substantial change in angular inertia is generated at the circular member due to counter rotational angular forces negating a change in angular inertia as the first and second arms rotate from the stored state to the deployed state.

DESCRIPTION OF THE DRAWINGS

Features of exemplary implementations of the invention will become apparent from the description, the claims, and the accompanying drawings in which:

FIG. 1 is a perspective view of an aircraft deploying a tactical munitions dispenser containing a plurality of deployable unmanned aviation vehicles (UAV) for which an embodiment of the present invention is suited.

FIG. 2 is a perspective view of an exemplary UAV in its stored condition.

FIG. 3 shows an exemplary UAV having been deployed and in flight.

FIG. 6 is an exploded view of the exemplary embodiment in accordance with the present invention.

FIG. 7 shows a partial view illustrating an alternate embodiment of the present invention illustrating a stored state.

FIG. 8 shows the alternate embodiment as seen in FIG. 7 illustrating a deployed state.

DETAILED DESCRIPTION

Figure 4:
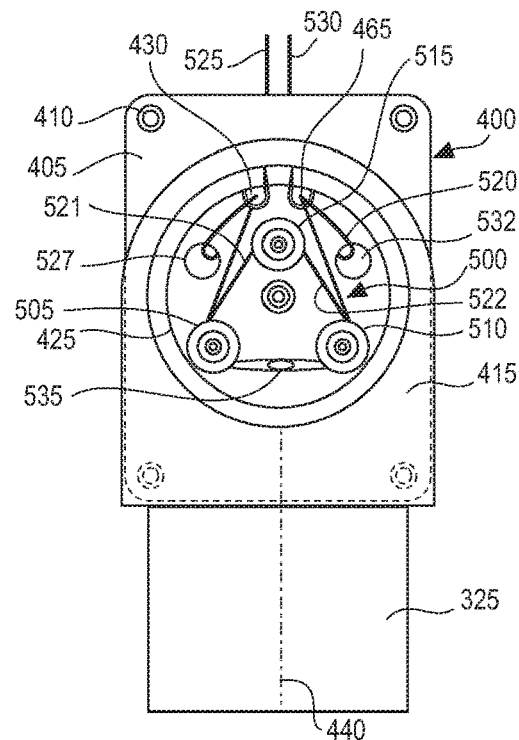
FIG. 4 is a top view of an exemplary embodiment of a pivot assembly in accordance with the present invention in a stored/non-deployed condition.

One aspect of the present invention resides in the recognition of the difficulties associated with trying to use conventional electromechanically driven pivot mechanisms in applications where limited physical space, a requirement for minimized weight, and the desired for inertial stability during operation are required. It is believed that those skilled in the relevant art will appreciate the benefits and attributes associated with the below described embodiment of the present invention and understand that the above described requirements are satisfied by the exemplary embodiment.

FIG. 1 shows an aircraft 105 deploying a tactical munitions dispenser 110 containing a plurality of deployable unmanned aviation vehicles (UAV) 115 for which an embodiment of the present invention is suited. The UAVs 115 are carried in the dispenser 110 in a folded condition in order to minimize the volume occupied by each UAV. This application is merely illustrative of many applications in which an item is stored in a folded condition in order to minimize the volume occupied but has members/arms which are required to be extended when the item is removed from storage and placed in operation.

FIG. 2 shows the exemplary UAV 115 in its stored condition. A body or fuselage 120 carries an upper wing 125 and a lower wing 130 that are stored adjacent and parallel to each other. An electrically activated pivot mechanism 135, coupled to the upper and lower front wings 125, 130, when activated causes the upper wing 125 to rotate counterclockwise to form an extended right wing and causes the lower wing 130 to rotate clockwise to form an extended left wing. Another electrically activated pivot mechanism is coupled to the upper and lower aft wings, and when activated causes the upper aft wing to rotate counterclockwise to form another extended right wing and causes the lower aft wing to rotate clockwise to form another extended left wing.

FIG. 3 shows an exemplary UAV 305 having been deployed and in flight. The central fuselage 310 supports left wing 315 and right wing 316 disposed above the fuselage. Similarly, right and left aft wings 320 are disposed below the fuselage. Twin vertical stabilizers 325 extend upward away from the fuselage. An exemplary propeller 330 driven by a motor (not shown) powers the aircraft and obtains energy from a battery 335 housed in the fuselage. Comparing the deployed UAV 305 with its stored state 115, it will be apparent that the wings as well as the vertical stabilizers and propeller have all moved from folded and/or contracted positions in the stored state into extended positions for operation. As used herein an "unmanned aeronautical vehicle" refers to conventional UAVs and space craft as well as structures that are deployed in space.

Figure 5:
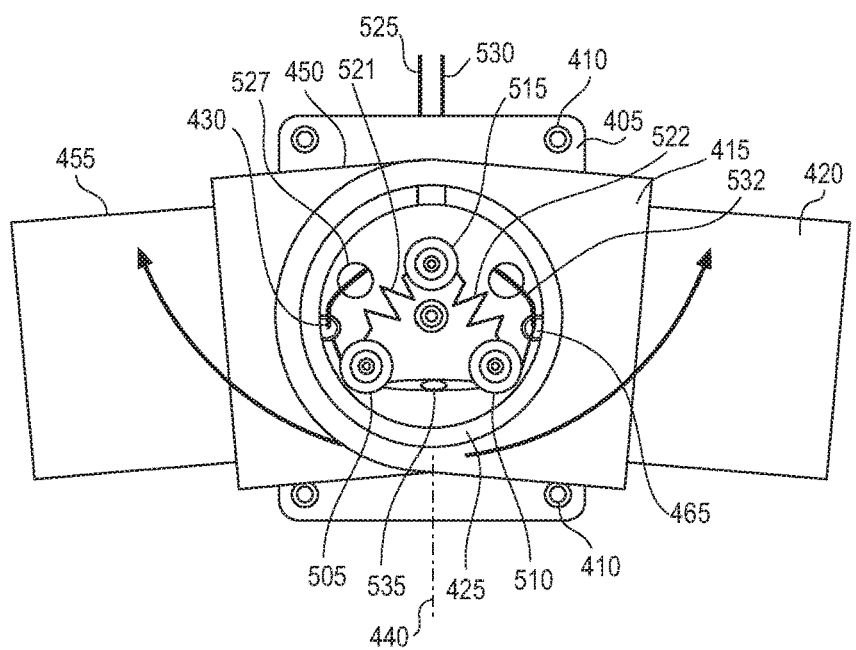
FIG. 5 is a top view of the exemplary embodiment as shown in FIG. 4 in a deployed condition.

FIGS. 4, 5 and 6 show an exemplary embodiment of an electrically driven pivot assembly 400 in accordance with the present invention. FIG. 4 shows the electrically driven pivot assembly 400 in a stored/non-deployed condition while FIG. 5 shows it in a deployed condition. FIG. 6 provides an exploded view of electrically driven pivot assembly 400. The same components are identified in these figures by the same reference numeral.

A generally rectangular base 405 has four mounting holes 410 near the corners that accept corresponding screws for mounting the base 405, and hence the electrically driven pivot mechanism 400, to another structure, e.g. in this example fuselage 120. In the exemplary embodiment, an upper pivotable arm includes a pivot mounting section 415 and a wing engagement arm 420 to which is attached wing 316 that extends radially outward and lies substantially within the as plane as the pivot mounting section 415. The pivot mounting section 415 includes an internal wall 425 that encloses a circular opening. A tab 430 extends inwardly from wall 425 and includes a hole.

As best seen in FIGS. 5 and 6, an lower pivotable arm includes a pivot mounting section 450 and a wing engagement arm 455 to which is attached wing 315 that extends radially outward and lies substantially within the as plane as the pivot mounting section 455. The pivot mounting section 450 includes an internal wall 460 that encloses a circular opening. A tab 465 extends inwardly from wall 460 and includes a hole.

As best seen in FIG. 5, the upper pivotable arm has pivoted from a starting position as seen in FIG. 4 centered about longitudinal axis 440 in the stored position counter-clockwise about base 405 to reach a deployed or operational position almost perpendicular to axis 440. Simultaneously with the pivoting of the upper arm, the lower pivotable arm pivots from a starting position centered about longitudinal axis 440 in the stored position clockwise about base 405 to reach a deployed or operational position almost perpendicular to axis 440 and almost 180 degrees from the upper pivotable arm.

The exploded view shown in FIG. 6 shows additional details concerning the pivoting mechanism and the electrical drive that causes the upper and lower arms to simultaneously counter rotate and pivot from respective stored positions to respective deployed positions. The base 405 includes a circular collar 470 extending substantially perpendicular from a planar surface of base 405. A slot 475 in collar 470 is parallel to the planar surface of base 405 and extends approximately 90° from the transverse opening 485 in the collar. A similar slot 480 in collar 470 extends approximately 90° from the transverse opening 485 in the collar. However the slot 480 extends in an direction opposite to slot 475 and is disposed at a different depth from the distal edge of the circular wall of collar 470 than slot 475. A mounting support 490 extends transverse to base 405 and is centered within collar 470. A threaded hole at the distal end of the mounting support 490 is adapted to receive a screw that passes through corresponding whole 498 in cover plate 497 to secure and enclose the assembled pivot mechanism. The distal end of the mounting support 490 is substantially level with the distal edge of collar 470. Three mounting rods 495 project from the surface of base 405 within collar 470 and are spaced around mounting rod 490. The distal ends of these mounting rods 495 are shorter than the distal edge of collar 470 and are utilized amount pulleys in a pulley assembly as will be described below.

An electrical drive assembly 500 includes three pulleys 505, 510 and 515 each rotatably mounted to the distal end of a respective mounting support 490. The pulleys rotate about respective axes perpendicular to the planar surface of base 405. In this illustrated embodiment, a length of wire 520 is wrapped about the pulleys and has one end terminating at and attached to tab 430 and the other end terminating at and attached to tab 465. The wire 520 is selected to have a characteristic wherein its length changes as it is heated due to the flow of electrical current. For example, wire 520 may be made of Nitinol that has been conditioned as will be explained below. Conventional conductive wires 525 and 530 are routed through holes 527 and 532, respectively, in base 505 and are coupled to the respective ends of wire 520 at tabs 430 and 465.

The conventional conductive wires 525 and 530 are connected to a switchable source of DC voltage that selectively supplies the flow of DC current that will flow through wire 520. In the illustrative application of a UAV, a power source such as a battery 335 will be contained within the fuselage and will provide power for propulsion, electronic navigation, and other functions. Upon the UAV sensing it is to transform from a stored state to a deployed state, e.g. such as by an electronic communication or by sensing the flow of air, the power source of the UAV will be switched to provide the flow of DC current through wire 520 for a sufficient interval of time and with sufficient magnitude to cause sections 521 and 522 of wire 520 to deform into the trained shape thereby shortening the effective overall length of wire 520. A wire 520 made of Nitinol will have been previously conditioned by the application of heat and physical positioning so that at least sections 521 and 522 will deform in a way to cause the effective length of the wire 520 to shorten. For example, the sections 521 and 522 of wire could be conditioned to form a tightly wound helical spring when again subjected to a sufficiently high temperature such as created by the flow of an appropriate amount of current through the wire.

The electrical drive assembly 500 utilizes the physical force generated by the contraction of wire 520 due to the application of sufficient current through the wire to cause the pivot mounting section 415 to rotate counterclockwise while simultaneously causing the pivot mounting section 450 to rotate clockwise. The wire 520 is wrapped about the pulleys starting at the end anchored at tab 430 about pulley 505, then pulley 510, then pulley 515, then pulley 505 again, then pulley 510 again, with the other end terminating at tab 465. An insulator 535 between the two lengths of wire between pulleys 505 and 510 may be used to prevent electrical contact between these two lengths of wire. Alternatively, these lengths of wire may be protected by insulation running along these portions, or the entire length of wire 520 may be insulated with a material that will not substantially restrict the conditioned deformation causing the shortening of the length of the wire.

As current flowing through wire 520, the temperature in the wire rises and initiates the beginning of deformation of the wire, the shortening of the length of the wire as disposed around the pulleys exerts a force on tabs 430 and 465 causing the tabs to move from a stored position as shown in FIG. 4 to a deployed position as shown in FIG. 5. That is, tab 430 has been rotated clockwise and tab 465 has been rotated counterclockwise. As best seen in FIG. 6, the bottom pivot mounting section 450 has an internal circular wall 460 dimensioned to rotate around the external circular wall formed by collar 470. Tab 465 is initially aligned with transverse opening 485 of the collar 470 permitting the tab 465 to enter and reside within slot 480. Similarly, the top pivot mounting section 415 has an internal circular wall 425 dimensioned to rotate around the external circular wall formed by collar 470. Tab 430 is initially aligned with transverse opening 485 of the collar 470 permitting the tab 430 to enter and reside within slot 475. The thickness of the pivot mounting sections and the height and widths of the slots in the collar are such that the respective tabs freely traverse around the respective slots with only negligible friction compared to the total friction encountered.

As force is applied against tabs 465 and 430 due to the contraction of the length of wire 520, the bottom pivot mounting section 450 rotates about the collar 470 until the tab 465 reaches the end 481 of slot 480 where the end 481 functions as a stop terminating the rotational travel of bottom pivot mounting section 450. Similarly, the top pivot mounting section 415 rotates about the collar 470 until the tab 430 reaches the end 476 of slot 475 where the end functions as a stop ending the rotational travel of the top pivot mounting section 415. Assuming that the friction associated with the rotation of the bottom and top pivot mounting sections is substantially equal, the respective wings associated with the bottom and top pivot mounting sections will simultaneously deploy from the stored to the operational positions. That is, the angular rotation force of the respective pivot mounting sections will be substantially equal but opposite. This results in no change in the rotational inertia due to deployment of the wings since equal but opposing forces are simultaneously applied.

The illustrated embodiment is advantageous in that alternatives such as large and heavy actuators/solenoids or springs are not required. In addition to minimizing the weight associated with a rotational drive assembly, the illustrated embodiment occupies only a small volume. After the contraction of the Nitinol wire, it can then be manually stretched back to its initial state/length while not being subjected to heating. This permits usage of the drive mechanism in accordance with the illustrated embodiment a number of times. Being able to simultaneously deploy wings or other members without causing a change in the rotational inertia provides a definite advantage in some environments, e.g. aeronautical applications, structures or vehicles that will deploy in space, etc.

FIG. 7 shows a partial view of an alternate embodiment 700 illustrating a stored state. In this embodiment circular collar 705 extends from a base and includes a center support 710 to facilitate the mounting of a cap similar to the previously described embodiment. Tabs 715 and 720 extend from respective right and left arms. In this embodiment, a Nitinol wire 725 has ends mounted to tab 715 and 720, and has intermediate portions fixedly attached to support post 730 and 735. In this embodiment portions of the Nitinol wire between tab 715 and support 730 and tab 720 and support 735 have been conditioned to assume a tightly wound helical spring shape upon the Nitinol wire being heated by the flow of an appropriate amount of current.

FIG. 8 shows a similar partial view of the alternative embodiment 700 illustrating a deployed state. That is, sufficient current has flowed through the Nitinol wire to cause the above described portions to assume the tightly wound helical spring shape as shown. This causes a contraction of the lengths as shown in FIG. 7 so that the length contraction of the wire exerts sufficient force on tabs 715 and 720 to cause a rotation of the associated right and left arms into the deployed state.

This alternate embodiment 700 is merely representative of the potential variations in the physical location and structure of the Nitinol wire. In a further example, the two slots within the circular collar could be consolidated into a single slot with offset tabs attached to the pivoting components. In another example, referring to FIGS. 7 and 8, the section of wire between support 730 and 735 need not be Nitinol wire. That is, conventional copper wire could be utilized to electrically connect two separate Nitinol wires. As long as there is a sufficient contraction in length to provide sufficient force to cause both tabs to rotate to the deployed state and symmetry about the center is maintained, a number of different variations in terms of number of Nitinol wires utilized and the number and type of supports and/or anchors can be utilized in accordance with the vision and teachings provided herein.

Although exemplary implementations of the invention have been depicted and described in detail herein, it will be apparent to those skilled in the art that various modifications, additions, substitutions, and the like can be made without departing from the spirit of the invention. For example, bimetallic strips could be used instead of the Nitinol wire to supply force. Various routing patterns and/or multiple independent lengths of Nitinol wire could utilized as long as the desired amount of contraction in length during deployment is achieved.

The scope of the invention is defined in the following claims.

The invention claimed is:

1. A rotational assembly comprising:
   a base;
   a circular collar member rotatably mounted to the base, the circular collar member having a circular periphery;
   first and second arms dimensioned to engage and rotate about the circular member in opposite angular directions, the first and second arms being in a stored state when each arm has substantially the same angle relative to the circular member and a deployed state when the first and second arms have each rotated and are not at substantially the same angle relative to the circular member;
   an electrical member coupled to the circular collar and residing within the circular periphery, the electrical member changing dimensions when heated due to electrical current flowing in the electrical member, a change in dimension of the electrical member simultaneously applying a rotational force to the first and second arms in the stored state when electrical current is applied to the electrical member causing the first arm to rotate about the circular member in one angular direction and the second arm to rotate about the circular member in an angular direction opposite the one angular direction, the electrical member residing within the circular periphery when heated and when not heated.

2. The rotational assembly of claim 1 wherein the electrical member is Nitinol wire having at least one portion that has been conditioned to deform when subjected to higher temperatures due to the flow of current causing the length of the Nitinol wire to shorten from its length in the stored state to a shorter length in the deployed state.

3. The rotational assembly of claim 1 further comprising at least two pulleys, a single length of the electrical member being wound about the at least two pulleys, the at least two pulleys residing within the circular periphery.

4. The rotational assembly of claim 3 wherein the at least two pulleys comprise three pulleys each with a fixed axis of rotation relative to the base.

5. The rotational assembly of claim 3 wherein the circular collar member rotates around the at least two pulleys.

6. The rotational assembly of claim 1 further comprising at least one anchor at a fixed position relative to the base, the electrical member being elongated and an intermediate segment of the electrical member being supported by the at least one anchor, one end of the electrical member attached to the first arm and the other end of the electrical member attached to the second arm, a first segment of the electrical member being between the one end and the anchor and a second segment of the electrical member being between the other end and the anchor, the first and second segment of the electrical member contracting in length when electrical current is applied to the electrical member.

7. The rotational assembly of claim 3 wherein axes of rotation of each of the at least two pulleys maintain a fixed relationship to each other regardless of whether the electrical member is heated or not.

8. A rotational assembly comprising:
a base having a circular member;
first and second arms dimensioned to engage and rotate about the circular member in opposite angular directions, the first and second arms being in a stored state when each arm has substantially the same angle relative to the circular member and a deployed state when the first and second arms have each rotated and are not at substantially the same angle relative to the circular member;
an electrical member coupled to the first and second arms, the electrical member changing dimensions when heated due to electrical current flowing in the electrical member, a change in dimension of the electrical member simultaneously applying a rotational force to the first and second arms in the stored state when electrical current is applied to the electrical member causing the first arm to rotate about the circular member in one angular direction and the second arm to rotate about the circular member in an angular direction opposite the one angular direction;
the circular member being a circular collar projecting from and attached to the base;
at least one slot within the circular collar;
the first and second arms each having an interior circular wall dimensioned to fit about an exterior wall of the circular collar for rotation of the first and second arms about the circular collar;
at least one slot within the circular collar;
first and second tabs extending inward from the interior circular wall of the first and second arms, respectively;
the first and second tabs projecting into the at least one slot;
the electrical member coupled to the first and second tabs and causing the first and second tabs to move along the at least one slot from respective positions along the at least one slot in the stored state to different positions along the at least one slot in the deployed state, whereby the first and second arms are rotated about the circular collar.

9. The rotational assembly of claim 8 wherein the electrical member and at least a portion of the first and second tabs reside within an interior wall of the circular collar.

10. The rotational assembly of claim 8 wherein the electrical member is Nitinol wire.

11. The rotational assembly of claim 10 further comprising at least one pulley that is free to rotate at a fixed position relative to the base and mounted inside the interior wall of the circular collar, at least an intermediate portion of the Nitinol wire wound about the pulley and ends of the Nitinol wire attached to the first and second tabs, respectively.

12. The rotational assembly of claim 10 further comprising at least one anchor at a fixed position relative to the base and mounted inside the interior wall of the circular collar, at least an intermediate portion of the Nitinol wire wound supported by the anchor and ends of the Nitinol wire attached to the first and second tabs, respectively.

13. The rotational assembly of claim 1 wherein the electrical member applies simultaneous equal counter rotating angular forces while causing rotation of the first and second arms so as to cause no substantial change in angular inertia at the base.

14. The rotational assembly of claim 2 wherein the Nitinol wire applies simultaneous equal counter rotating angular forces while causing rotation of the first and second arms so as to cause no substantial change in angular inertia at the base.

15. The rotational assembly of claim 10 wherein the electrical member applies simultaneous equal counter rotating angular forces while causing rotation of the first and second arms so as to cause no substantial change in angular inertia at the base.

16. An unmanned aeronautical vehicle having first and second arms that are substantially adjacent each other in a stored state but being extendible in a deployed state to be substantially opposite each other, the unmanned aeronautical vehicle comprising:
a base;
a circular collar member rotatably mounted to the base, the circular collar member having a circular periphery;
the first and second arms dimensioned to engage and rotate about the circular member in opposite angular directions, the first and second arms being in the stored state when each arm has substantially the same angle relative to the circular member and being in the deployed state when the first and second arms have each rotated and are not at substantially the same angle relative to the circular member;
an electrical member coupled to the circular collar and residing within the circular periphery, the electrical member changing dimensions when heated due to electrical current flowing in the electrical member, a change in dimension of the electrical member simultaneously applying a rotational force to the first and second arms in the stored state when electrical current is applied to the electrical member causing the first arm to rotate about the circular member in one angular direction and the second arm to rotate about the circular member in an angular direction opposite the one angular direction, the electrical member residing within the circular periphery when heated and when not heated;

switchable power source coupled to the electrical member and supplying the electrical current to cause the change in dimension of the electrical member.

17. The unmanned aeronautical vehicle of claim 16 wherein the electrical member is Nitinol wire having at least one portion that has been conditioned to deform causing the length of the Nitinol wire to shorten from its length in the stored state to a shorter length in the deployed state, one end of the Nitinol wire coupled to the first arm and the other end coupled to the second arm.

18. An unmanned aeronautical vehicle having first and second arms that are substantially adjacent each other in a stored state but being extendible in a deployed state to be substantially opposite each other, the unmanned aeronautical vehicle comprising:
  a base having a circular member;
  the first and second arms dimensioned to engage and rotate about the circular member in opposite angular directions, the first and second arms being in the stored state when each arm has substantially the same angle relative to the circular member and being in the deployed state when the first and second arms have each rotated and are not at substantially the same angle relative to the circular member;
  an electrical member coupled to the first and second arms, the electrical member changing dimension when heated due to electrical current flowing in the electrical member, a change in dimension of the electrical member simultaneously applying a rotational force to the first and second arms in the stored state when electrical current is applied to the electrical member causing the first arm to rotate about the circular member in one angular direction and the second arm to rotate about the circular member in an angular direction opposite the one angular direction;
  switchable power source coupled to the electrical member and supplying the electrical current to cause the change in dimension of the electrical member;
  the circular member being a circular collar projecting from and attached to the base;
  at least one slot within the circular collar;
  the first and second arms each having an interior circular wall dimensioned to fit about an exterior wall of the circular collar for rotation of the first and second arms about the circular collar;
  at least one slot within the circular collar;
  first and second tabs extending inward from the interior circular wall of the first and second arms, respectively;
  the first and second tabs projecting into the at least one slot;
  the electrical member coupled to the first and second tabs and causing the first and second tabs to move along the at least one slot from respective positions along the at least one slot in the stored state to different positions along the at least one slot in the deployed state, whereby the first and second arms are rotated about the circular collar.

19. The unmanned aeronautical vehicle of claim 16 wherein the electrical member applies simultaneous equal counter rotating angular forces while causing rotation of the first and second arms so as to cause no substantial change in angular inertia at the base.

\* \* \* \* \*